United States Patent [19]

Norris

[11] Patent Number: 5,352,850
[45] Date of Patent: Oct. 4, 1994

[54] JUNCTION BOX

[75] Inventor: Trevor W. Norris, Ashton-under-Lyne, England

[73] Assignee: Hawke Cable Glands Limited, West Midlands, England

[21] Appl. No.: 978,400

[22] Filed: Nov. 18, 1992

[30] Foreign Application Priority Data

Nov. 28, 1991 [GB] United Kingdom ............... 9125386.4

[51] Int. Cl.$^5$ ............................................. H02G 3/08
[52] U.S. Cl. ....................................................... 174/51
[58] Field of Search .......................................... 174/51

[56] References Cited

U.S. PATENT DOCUMENTS

| | | | |
|---|---|---|---|
| 3,210,458 | 10/1965 | Palmer | 174/51 |
| 3,415,942 | 12/1968 | Knoy | 174/51 |
| 3,634,598 | 1/1972 | Stanfield | 174/51 |
| 3,927,249 | 12/1975 | Pearse | 174/51 |
| 4,620,061 | 10/1986 | Appleton | 174/51 |

FOREIGN PATENT DOCUMENTS

| | | |
|---|---|---|
| 3242073 | 5/1984 | Fed. Rep. of Germany . |
| 649748 | 1/1951 | United Kingdom ............... 174/51 |
| 913625 | 12/1962 | United Kingdom . |
| 1091724 | 11/1967 | United Kingdom ............... 174/51 |
| 2232828 | 12/1990 | United Kingdom . |

Primary Examiner—Leo P. Picard
Assistant Examiner—David Tone
Attorney, Agent, or Firm—Larson and Taylor

[57] ABSTRACT

A non-conductive plastics junction box for connecting at least two cables has an internal conductive continuity plate integral with a base of the box. The plate has a base panel with at least one lug arranged to extend outwardly and externally of the base to provide an earthing terminal to ground, and side panels arranged to overlie side walls of the base in which entry ports are formed to receive cable glands for the respective cables. The continuity plate is in electrical contact with the glands and provides a continuous earthing path from the cables to the earthing terminal(s).

20 Claims, 6 Drawing Sheets

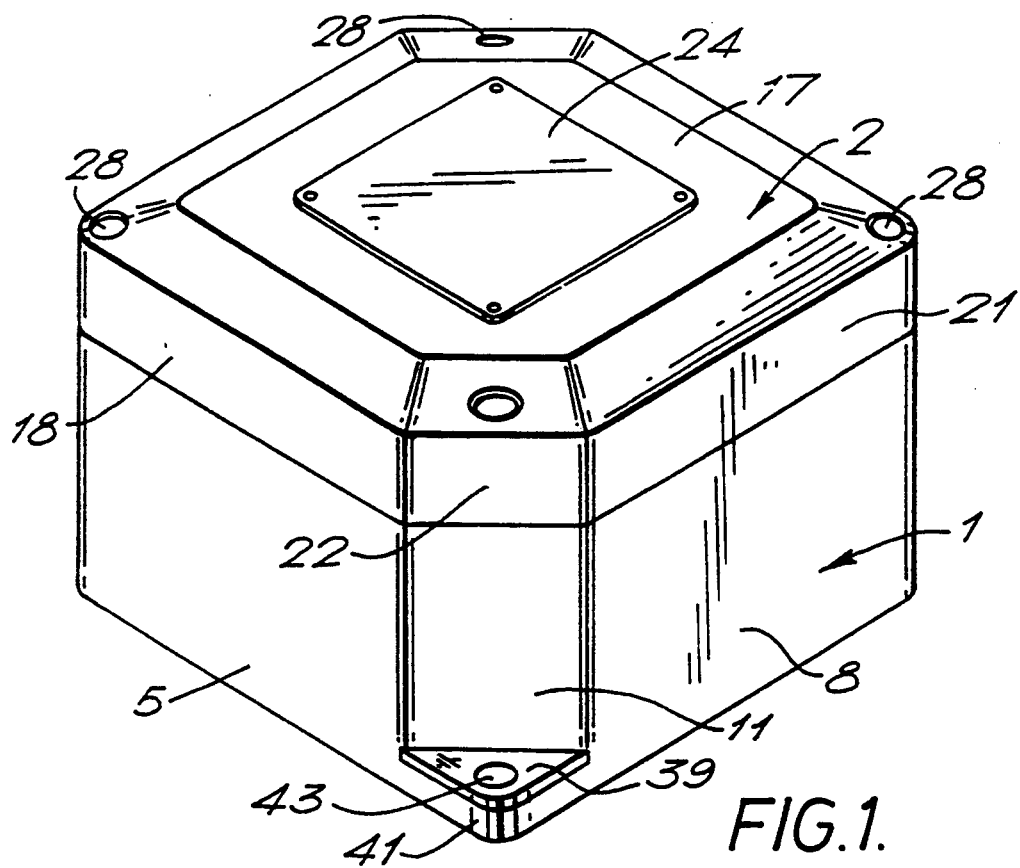
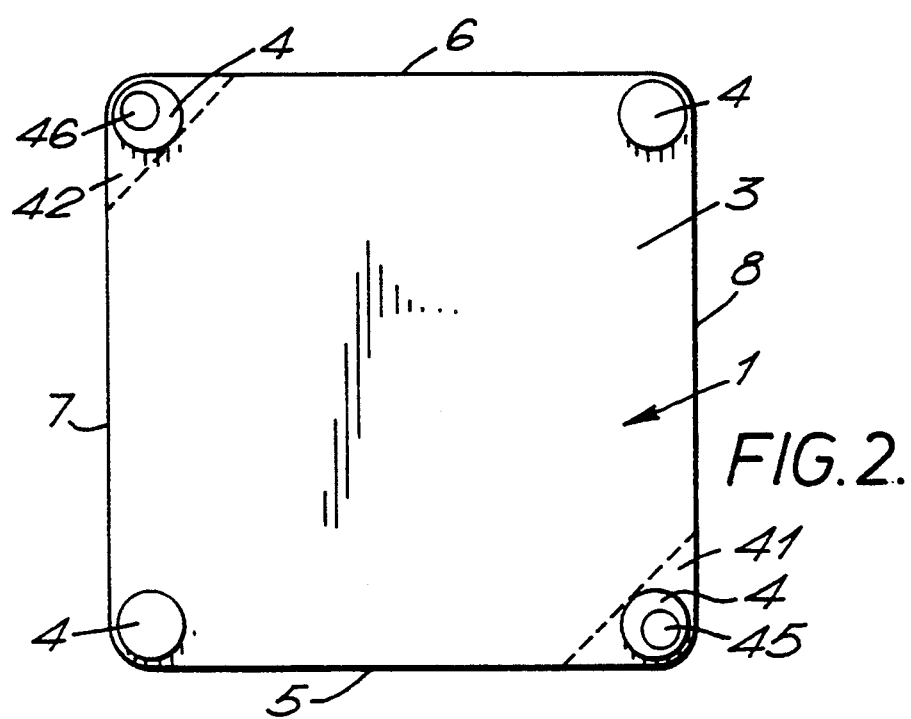

JUNCTION BOX

BACKGROUND OF THE INVENTION

This invention relates to a junction box for use in the connection of electric conductor leads or cables.

Junction boxes are used to enclose the exposed ends of the conductor leads and the terminal connection block or like connector. Conventionally, the conductor leads of a cable are entered into a junction box through cable glands assembled to the junction box and earthing continuity between the cables is necessary, In the use of traditional junction boxes made of metal, this continuity is achieved through the connection of the cable gland to the box and the connection of the box to some supporting earthed surface. However, there has been a need to improve the resistance of junction boxes to corrosion by atmospheric pollutants and ingress of moisture or other liquids, particularly as many electrical systems are used in hazardous locations, It is for these reasons that there has been a change of materials used for some kinds of junction boxes from metal to plastics materials. However, such plastics materials are usually non-conductive and have insularire properties so that special additional metal earthing plates or earthing tags have to be used when installing such a junction box. This is not satisfactory as the assembly and connections required for completing the earthing path is time-consuming to the fitter, and problems can arise if not fitted correctly or if corrosion occurs.

It is an object of this invention to provide a junction box of improved construction with a special arrangement for earthing continuity.

SUMMARY OF THE INVENTION

According to this invention, I provide a junction box having a base and a cover adapted to be secured together to provide an enclosure for electrical connections of at least two electric cables, the cover being of a non-conductive plastics material and the base being of a non-conductive plastics material and having integrally moulded therein a conductive continuity plate, the continuity plate having at least one lug extending outwardly and externally of the base to provide an earthing terminal to ground, and the continuity plate extending to the regions of entry ports formed in the base through which electric cables are to extend with the conductive plate being exposed at said regions for electrical contact with a cable gland fitting engaged with the cable and the entry port, the arrangement being such that In the assembly, there is a continuous earthing path from the respective cables through the continuity plate to the earthing terminal.

By this invention, I provide a junction box which has the desirable properties of being made of a plastics material with the additional advantage of the integral moulded continuity plate which provides in the base of the box the earthing path between the electrical cable connections and the external integral earthing terminal that projects through the moulded base.

Preferably, the base of the junction box has a continuity plate with at least two such lugs extending outwardly and externally of the base, and each such lug provides an earthing terminal.

Conveniently, such lugs of the continuity plate are spaced apart around the periphery of the base to provide alternative earthing terminal positions for connection to earth.

Preferably, the base includes a bottom wall having supporting feet, and at least one of the lugs of the continuity plate is arranged to overlie one of the mounting feet.

By such an arrangement of supporting feet and the lug of the continuity plate, the securing of the base to a mounting structure by conductive screws or the like will provide the electrical earthing path to the mounting structure without any special earthing tags or additional connections solely for earthing purposes.

The base of the junction box has sidewalls in which the entry ports are formed with the continuity plate having wall panels which overlie the side walls in the regions of the entry ports, and each entry port having an internal thread for engagement with a cable gland.

By this arrangement, when the cable gland is fitted to the entry port, the threaded face of the continuity plate at the entry port is in electrical contact with the cable gland and the cable gland Is secured to the junction box base by the threaded engagement within the entry port. Accordingly, on fitting the cable gland to the entry port, the earthing continuity connection is made without any special need for an earthing terminal or tag connection between the base and the cable gland.

In a preferred shape and style of junction box, the box is generally of square shape in plan view with two earthing lugs projecting from diagonally opposed corners of the base.

In such preferred junction box, there are four side wall of the base and each side wall has an overlying wall panel of the continuity plate.

In such preferred shape and style, each side wall may include at least one entry port and a variety of electrical connections with several electric cables may be used therewith whilst still relying on the simple means for electrical earthing continuity.

The plastics material may be any suitable polymer or a glass-filled polyester. In the manufacture of the base, the continuity plate would be located in a die and the plastics material is formed therearound so that the plate is integral with the base.

Various other features of the invention and advantages thereof will be referred to later herein with reference to embodiments of the invention.

An exemplary embodiment of a junction box according to this invention will now be described with reference to the accompanying drawings.

BRIEF DESCRIPTION OF THE DRAWINGS

FIG. 1 is an isometric view of a junction box with the cover in place on the base but without any electrical connections;

FIG. 2 is a plan view of the underside of the box shown in FIG. 1;

DETAILED DESCRIPTION OF THE EXEMPLARY EMBODIMENTS

Figure 3:
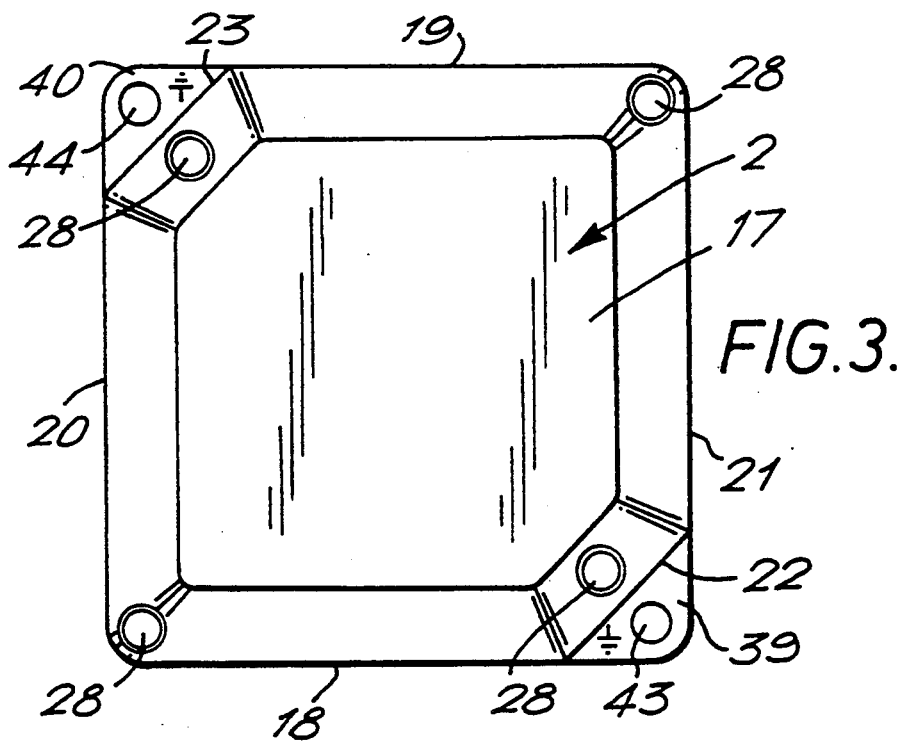
FIG. 3 is a plan view of the top of the box as shown in FIG. 2 without a signplate.
Figure 4:
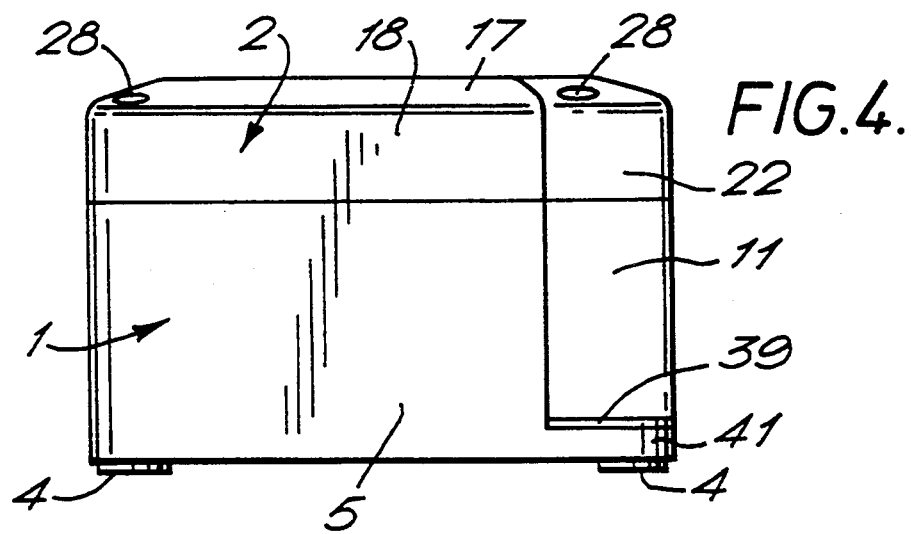
FIG. 4 is a side elevation of the box in the direction of arrow B shown in FIG. 3.

With reference to the accompanying drawings, the junction box comprises a base 1 and a cover 2. The base 1 has a bottom wall 3 of substantially square shape and on the underside there are four spaced apart feet 4 to support the junction box on a mounting surface (not shown).

The base 1 has opposed side walls 5, 6 and 7, 8 upstanding therefrom with these side walls extending normally to each other and substantially normal to the bottom wall 3 with diagonally opposed corner pillars 9, 10 conjoining walls 6, 8 and 5, 7 respectively. The base 1 further comprises diagonally opposed angled side corner walls 11, 12 which conjoin side walls 5, 8 and 6, 7 respectively. Each of the corner walls 11, 12 includes an internal pillar formation 13, 14 respectively.

The top faces of all of the side walls and pillars form a contiguous peripheral top face 15 (FIG. 7) formed with an inner upstanding peripheral rib 16 for sealing purposes as later explained.

Figure 10:
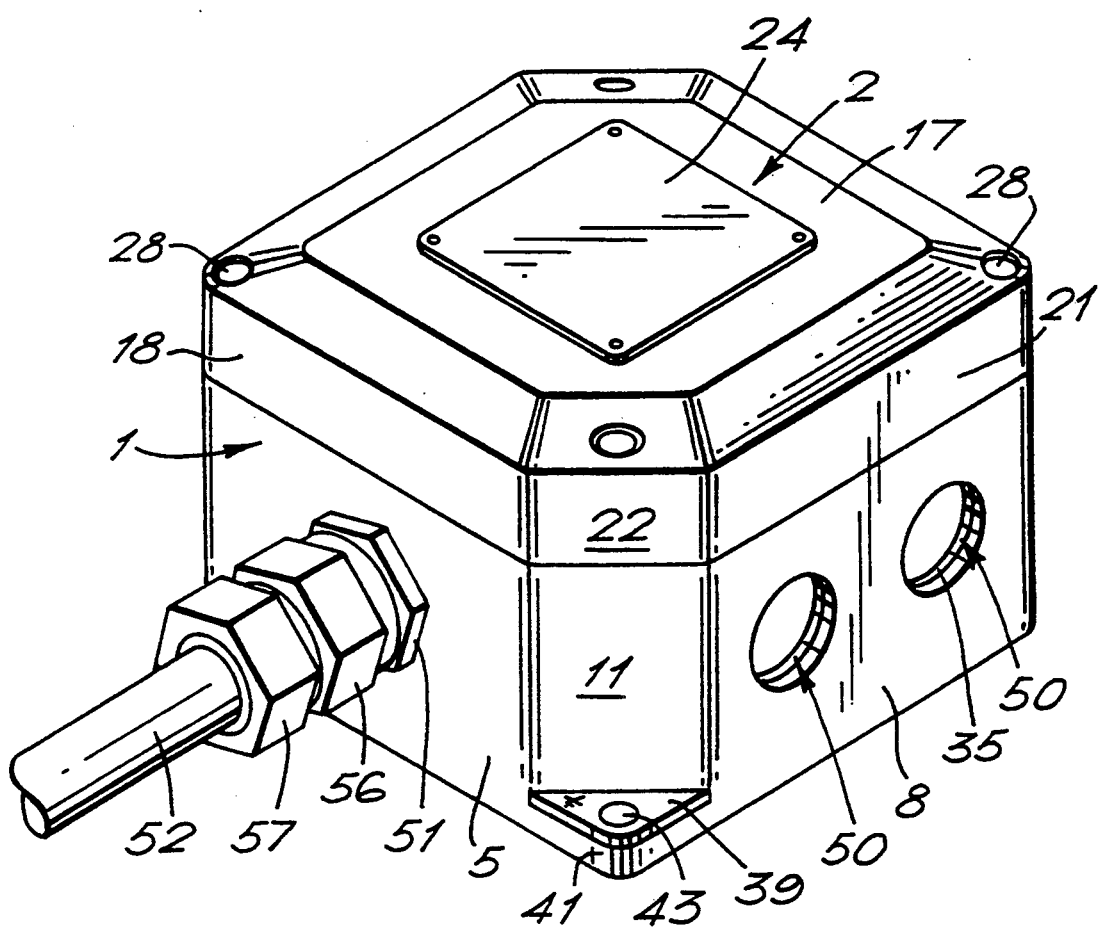
FIG. 10 is an isometric view of a junction box having a cable connected through one entry on one side wall and showing two cable entries on another side wall.

The cover 2 complements the base 1 and has a top wall 17 of substantially square shape, opposed side walls 18, 19 and 20, 21 depending therefrom with angled side corner walls 22, 23 extending respectively between side walls 18, 21 and 19, 20. In a similar manner as described for the base 1, each internal corner of the cover 2 may have pillars or like strengthening formations. As shown in FIGS. 1 and 10, the top wall 17 may have a signplate 24 affixed thereto for the purposes of identification or other marking for signifying the electrical connections on installation.

The lower faces of all of the side walls and pillars of the cover 2 form a contiguous peripheral lower face 25 (FIG. 8) which is formed with an inner peripheral groove 26 in which is seated a sealing ring 27. When the cover 2 is seated on the base 1, the rib 16 engages in the groove 26 to locate same and the rib 16 is in sealing engagement with the seal 27.

Figure 7:
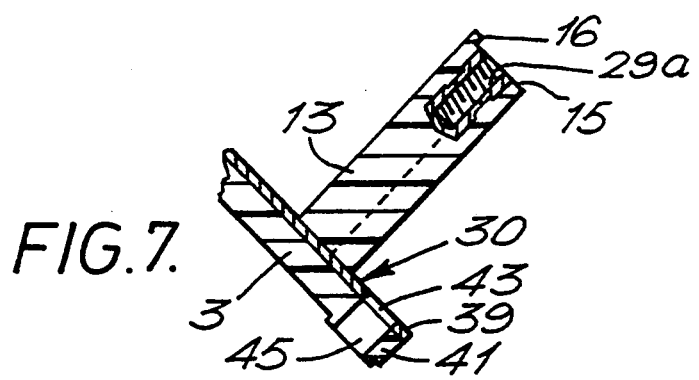
FIG. 7 is an enlarged detail sectional view of the box in the plane 7—7 shown in FIG. 6.

To secure the cover 2 to the base 1 the cover has, at each corner, a through hole 28 for receiving a screw (not shown), At each corner of the base aligned with each through hole 28, the base is provided with an internally threaded blind hole 29 remote from the extent of the sealing rib 16, The threaded blind hole 29 may be provided by a metal insert 29a located in a recess in the corner pillar as shown in FIG. 7.

The cover 2 is moulded of a suitable plastics material such as glass-filled polyester or a polymeric material, The selected material would be non-conductive and provide an insulated top to the junction box.

The base 1 is also a moulding of similar plastics material, but it includes an integral conductor plate 30 which is incorporated in the base during the moulding of the plastics material.

Figure 5:
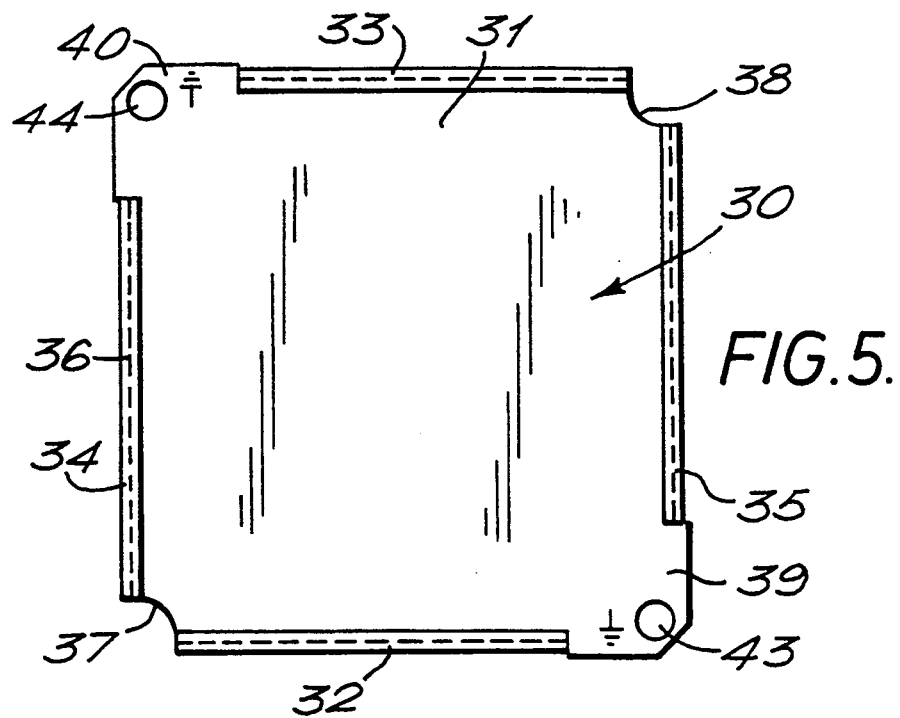
FIG. 5 is a top plan view of the continuity plate which forms an integral part of the base of the box.
Figure 8:
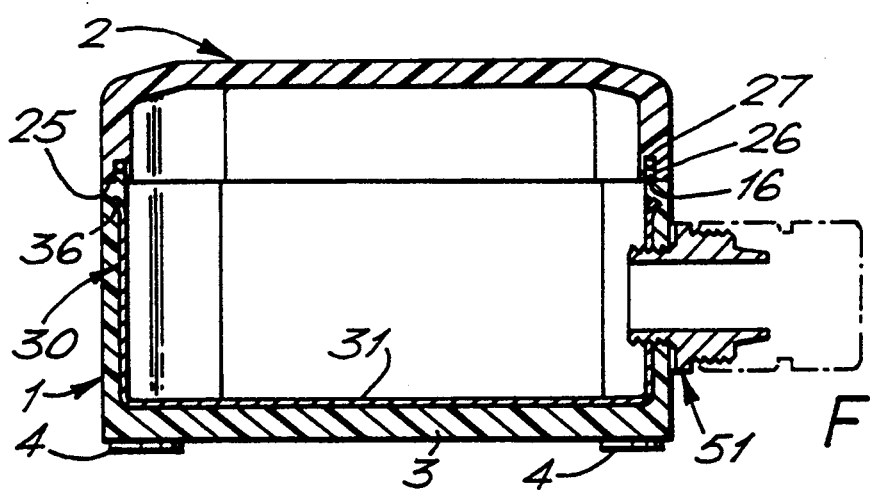
FIG. 8 is a transverse sectional view of the junction box showing the cover in situ and depicting a cable gland assembly part-fitted to the base.
Figure 9:
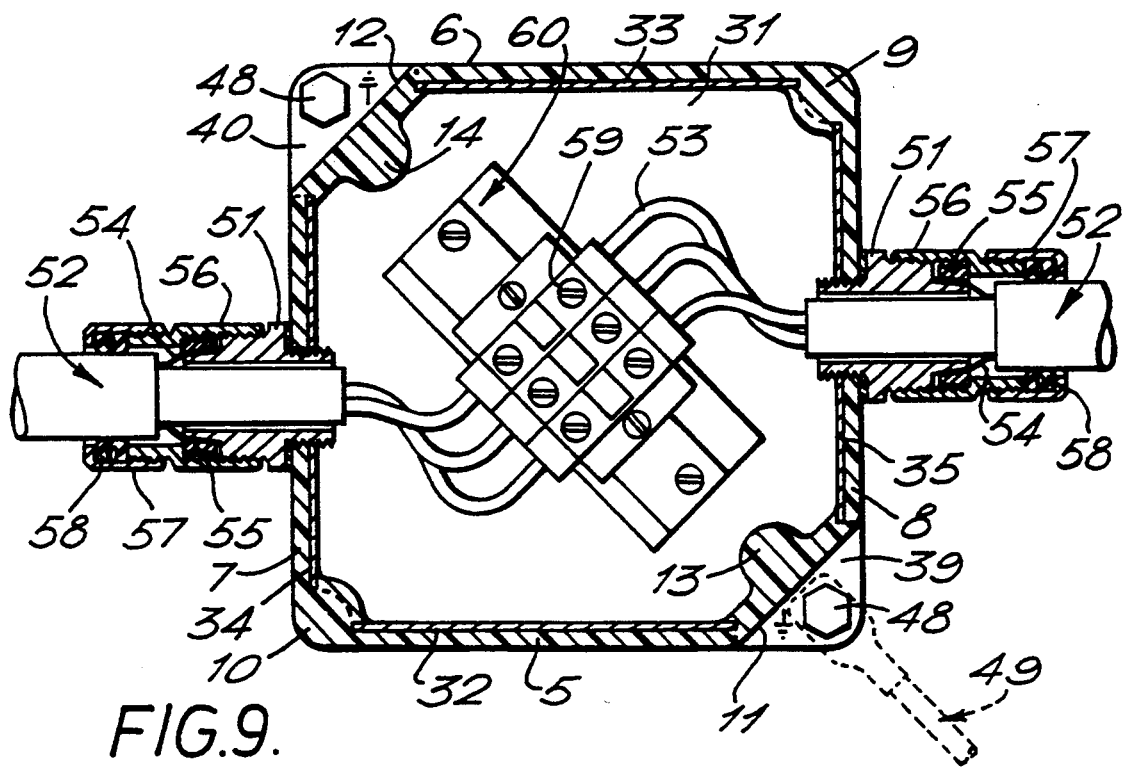
FIG. 9 is a part sectional plan view depicting the base of the junction box with assembled conductor leads, a connection block and respective cable glands.

As best shown in FIGS. 5, 8 and 9, the plate 30 is of conductive sheet metal that is formed to provide a generally square shaped base panel 31, four side panels 32, 33, 34 and 35 upstanding from the base panel 31 and terminating at their respective upper edges by a outwardly directed lip 36 by means of which the plate 30 is located with respect to the plastics material during and subsequent to moulding.

The base panel 31 has rebates 37, 38 at those two diagonally opposed corners corresponding to the corner pillars 9 and 10. At the other two diagonally opposed corners, the base panel 31 has outwardly extending corner lugs 39, 40 which are arranged to project through the respective corner pillars 13, 14 and to overlie the respective corner portions 41, 42 of the bottom wall 3 of the base 1 (see FIGS. 1, 2 and 9).

In the moulding of the plastics material, the conductor plate 31 is located in the moulding tool so that the plastics filling the die cavity flows a round the plate 31 including the corner lugs 39, 40 so that the engagement of the plastics material with the respective lugs also acts to secure the plate 31 in situ while ensuring integrity of the moulded assembly.

As will now be appreciated, the base 1 and cover 2 provide a box-like enclosure for an electrical connection for cables, and integral with the base there is the continuity plate 30 with the opposed externally presented corner lugs 39, 40.

Figure 6:
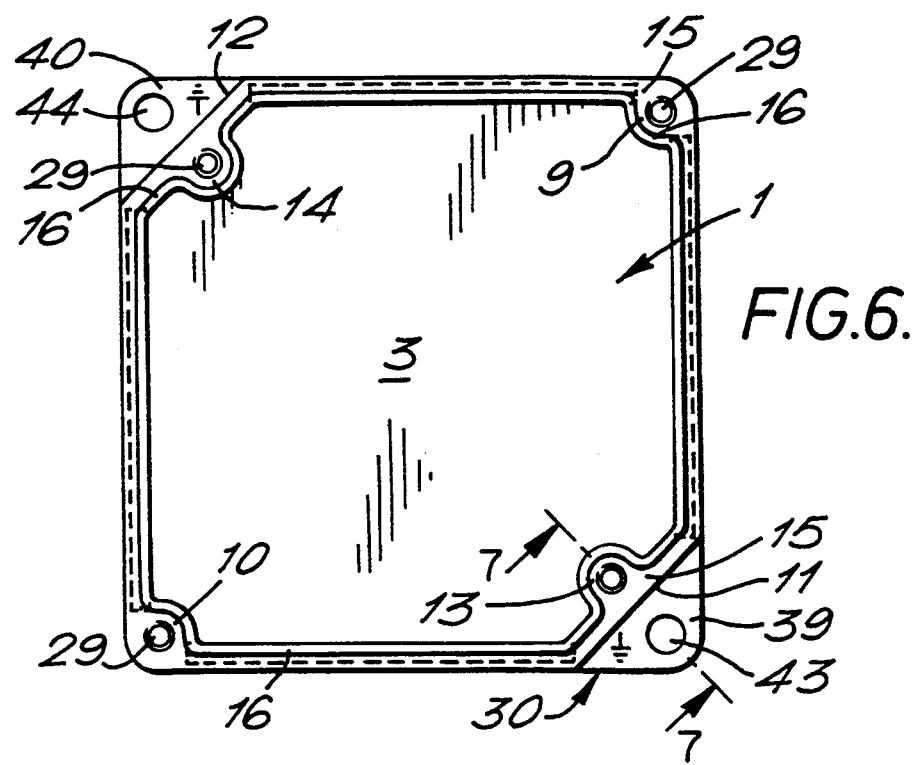
FIG. 6 is a top plan view of the base of the box.

As shown in FIGS. 6 and 7, each corner lug 39, 40 overlies the respective corner portions 41, 42 of the bottom wall 3 and each corner portion 41, 42 includes one of the mounting feet 4. Each corner lug 39, 40 has a respective through hole 43, 44, and each corner portion 41, 42 has an aligned respective through hole 45, 46.

One or both of the corner projections of the base 1 are arranged so that they may be used for securing or fixing the junction box to a mounting structure (not shown) by means of fixing screws or bolts 48 (FIG. 9).

In completing the fixing of the base of the junction box to the structure, the base of the box is connected to ground for earthing the junction box. If desired in certain applications, a separate earthing strip 49 (FIG. 9) could be assembled under the head of the fixing screw or bolt 48 and otherwise connected to an earthing conductor. Such an alternative arrangement will depend upon the electrical requirements and the mounting structure.

Figure 12:
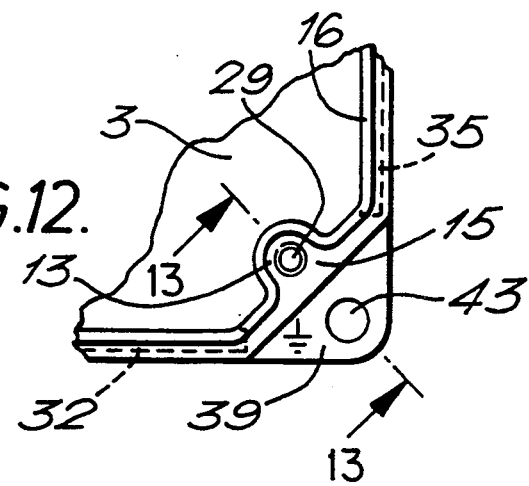
FIGS. 12 and 13 are views similar to FIGS. 6 and 7 respectively depicting an alternative arrangement and showing one portion of the junction box with the earthing terminal lug with a sectional view on plane 13—13 shown in FIG. 12.
Figure 13:
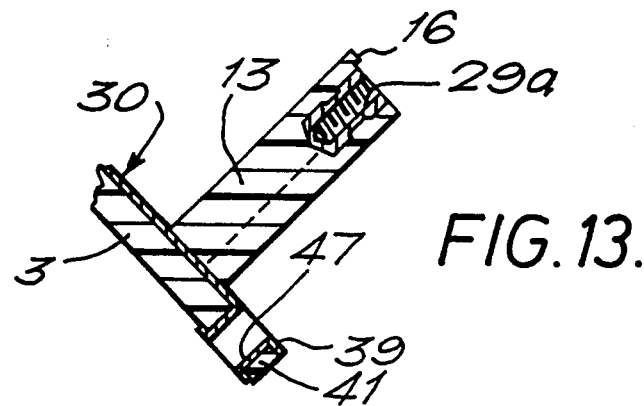

In the alternative arrangement as shown in FIGS. 12 and 13, the corner lugs 39, 40 are each provided with a metal bush 47 that is fitted through the through hole 43 and the aligned hole 45 in the corner portion of the base wall so that the bush projects to the underside of the foot 4 and will engage the mounting structure to provide a conductive earthing path. The bush 47 may be an interference fit in the aligned through holes and can be peened or pressed over at one or both ends to secure it in place. The bush 47 may have an internal thread for some special fixing applications. The bush 47 may be assembled to the corner lugs of the continuity plate prior to injection of the plastics so as to be integrally moulded therewith.

The junction box arrangement as just described can be made suitable for use for a wide range of applications to connect various electric cables. Each cable has to extend through a side wall of the base 1 and the connections are made inside the box in known manner. Exemplary arrangements are shown in the drawings to which further reference wi11 now be made.

As shown in FIG. 10, one side wall 8 is provided with two spaced apart entry ports 50. Each port 50 is similar and comprises an internally threaded bore through the side wall 8 and through the side panel 35 of the continuity plate 30. Each entry port 50 is adapted to receive a cable gland of which one known common type is as shown In FIG. 10 and in FIGS. 8, 9 and 11.

The cable gland comprises an externally threaded entry 51 which is engaged with the Internal thread of the entry port 50. The cable 52 with the individual electric conductor leads 53 extends through the entry 51 with the outer sheath of the cable 52 being stripped back to expose an earthing shield 54. A clamping ring 55 engages the free end of the entry 51 over the shield 54 and the clamping ring 55 is in threaded engagement with the external thread of the outer part of the entry 51 so that on tightening the assembly, the shield 54 is securely clamped and in electrical conductive contact with the entry 51, which, in turn, is in electrical conductive engagement with the panel 35 of the continuity plate 30. In known manner, the cable gland 50 also includes a cable nut 57 with an internal seal 58.

For those skilled in this field, it will be understood that there are many types of cable glands which can be used with such invented junction box, and the exemplary type of cable gland as just described briefly is not limitative of the applications of this invention.

In known manner, the free ends of the conductor leads 53 have their insulation removed, and are connected to respective terminals 59 of a connecting block 60. This arrangement is depicted in FIG. 9 showing the connections for two similar opposed cables with three core conductor leads connected to a single block 60. It will be appreciated that other types of connector block or terminal fittings may be housed and enclosed within the junction box, and this exemplary type of connector block is not limitative of this invention.

Figure 11:
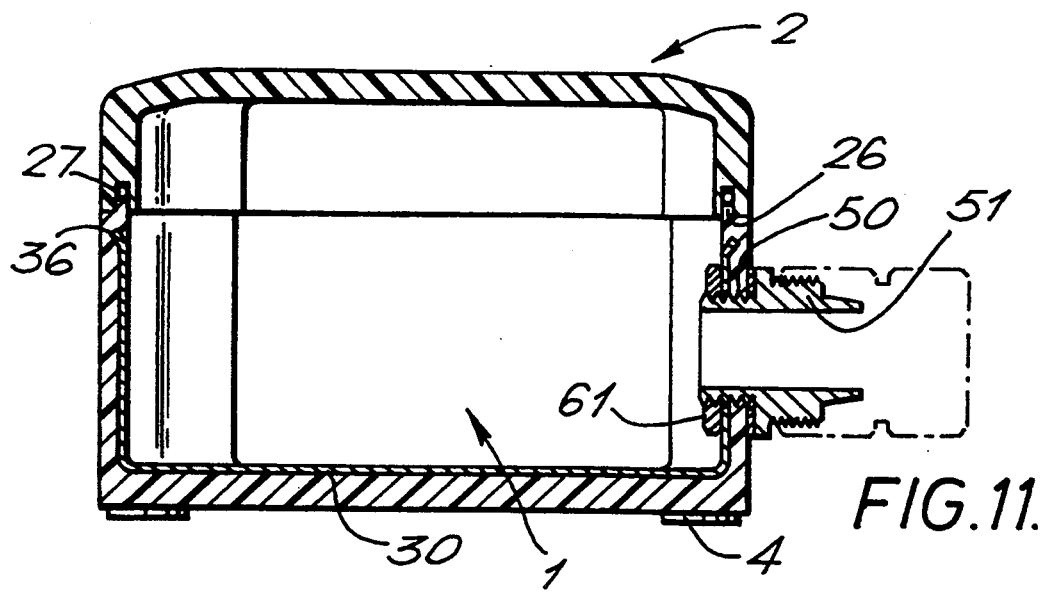
FIG. 11 is a view similar to that of FIG. 8 but showing a modified cable gland assembly and connection.

In the alternative arrangement depicted in FIG. 11, the entry 51 of the cable gland carries a nut 61 which is threaded onto the inner end of the entry 51 which projects inside the junction box. The nut 61 engages with the inside face of the wall of the continuity plate 30 and secures the cable clamp to the junction box wall against any effects of vibration, and additionally increases the conductive area engaged by the cable clamp for the earthing path. The use of the nut 61 is optional and will depend on the particular application and installation and any specified criteria.

As will now be appreciated, the invented junction box as described above provides an enclosure for an electical connection suitable for a wide range of cables and fittings with the junction box having the advantages of a robust construction from a corrosion and weather-resistant plastics material with the integral provision of the continuity plate which, on assembly of the cable gland fittings provides the earthing conductive path between the fittings and to earth on securing the box to the mounting structure through the exposed lugs of the continuity plate at opposed corners. As the entry of the cable gland is engaged with the entry port, then the electrical earthing path between the cable and the continuity plate is completed as the entry engages the threaded portion of the continuity plate surrounding the entry port. As the junction box is secured to the mounting structure, then the earthing path is completed.

This simple completion of the earthing connections for the continuity path required is achieved without any special assembly or fitting requirements.

Other variations of the junction box are deemed to be within the scope of this invention, and these include different shapes and sizes of the base and cover provided that the side walls were flat or had flattened areas at those regions where an entry port is to be formed. Preferably the base is provided with at least two projecting lugs for securing the box to a structure, but more mounting lugs could be provided with or without the extension of the continuity plate through the plastics side wall or bottom wall of the base.

The arrangement to seal the cover to the base may be modified, for instance to include a seal on the base and a lip or rim on the cover. Alternative forms of seals can be provided to ensure sealed engagement between the cover and the base.

All such variations and modifications will be apparent to those familiar with the diverse applications and uses of junction boxes in electrical installations.

I claim:

1. A junction box having a base and a cover adapted to be secured together to provide an enclosure for electrical connections of at least two electric cables, said cover being of a non-conductive plastics material and said base being of a non-conductive plastics material and having integrally moulded therein a conductive continuity plate, said continuity plate having at least one lug extending outwardly and externally of said base to provide an earthing terminal to ground, and said continuity plate extending to the regions of entry ports formed in said base through which electric cables are to extend with said continuity plate being exposed at said regions for electrical contact with a cable gland fitting engaged with the cable and said entry port, the arrangement being such that in the assembly, there is a continuous earthing path from the respective cables through said continuity plate to said earthing terminal.

2. A junction box according to claim 1 wherein said continuity plate has at least two lugs extending outwardly and externally of said base.

3. A junction box according to claim 2 wherein said lugs are spaced apart around the periphery of said base to provide respective earthing terminals to ground.

4. A junction box according to claim 1 wherein said base has supporting feet, and at least one lug of said continuity plate is arranged to overlie one of said supporting feet.

5. A junction box according to claim 4 wherein each lug overlying a supporting foot has a conductive bush extending through said foot.

6. A junction box according to claim 1 wherein said continuity plate has a base panel arranged to overlie a bottom wall of said base.

7. A junction box according to claim 6 wherein said continuity plate has side panels extending from said base panel and arranged to overlie side walls of said base in the region of said entry ports.

8. A junction box according to claim 7 wherein each side panel has an outwardly directed locating lip.

9. A junction box according to claim 1 wherein each entry port has an internal thread for engagement with a cable gland.

10. A junction box according to claim 1 wherein said box is generally of square shape in plan view.

11. A junction box according to claim 10 wherein said continuity plate has two earthing lugs projecting from diagonally opposed corners of said box.

12. A junction box according to claim 10 wherein said base has at least one entry port in each side of said box.

13. A junction box according to claim 10 wherein said base has a pillar at each corner of said box.

14. A junction box according to claim 13 wherein said cover is secured to said base at each corner.

15. A junction box according to claim 1 wherein said base and cover have opposed peripheral faces provided with complementary locating formations.

16. A junction box according to claim 15 wherein said locating formations comprise a contiguous rib on one face that engages in a contiguous groove in the other face.

17. A junction box according to claim 15 including a seal between said complementary formations.

18. A junction box according to claim 1 wherein said plastics material comprises a glass-filled polyester.

19. A junction box providing an enclosure for electrical connections of at least two electric cables, said junction box being of non-conductive plastics material and having an integral conductive continuity plate located within said enclosure for electrical contact with a cable entry fitting mounted on said junction box, said continuity plate having at least one lug extending outwardly and externally of said junction box to provide an earthing terminal to ground.

20. A method of manufacturing the junction box according to claim 1 comprising locating said continuity plate in a mould cavity defining said base of said box, filling said cavity with plastics material to form said base substantially externally of said continuity plate with said at least one lug of said continuity plate extending outwardly and externally of said base, and removing said base from said cavity with said continuity plate secured integrally therewith.

* * * * *